(12) United States Patent
Liu et al.

(10) Patent No.: US 12,022,206 B2
(45) Date of Patent: Jun. 25, 2024

(54) DIRECTIONALLY-ENHANCED AUTOMATIC WHITE BALANCING (AWB) CONVERGENCE

(71) Applicant: QUALCOMM Incorporated, San Diego, CA (US)

(72) Inventors: Wei-Chih Liu, Taipei (TW); Yi-Chun Hsu, Taipei (TW); Tsung-Yen Chen, Taichung (TW); Tai-Hsiang Jen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/648,786

(22) Filed: Jan. 24, 2022

(65) Prior Publication Data
US 2023/0239584 A1    Jul. 27, 2023

(51) Int. Cl.
*H04N 23/88* (2023.01)
*G06T 7/90* (2017.01)

(52) U.S. Cl.
CPC ............ *H04N 23/88* (2023.01); *G06T 7/90* (2017.01); *G06T 2207/10024* (2013.01)

(58) Field of Classification Search
CPC ........ H04N 23/88; H04N 1/6077; G06T 7/90; G06T 2207/10024
See application file for complete search history.

(56) References Cited

U.S. PATENT DOCUMENTS

| 2010/0020193 | A1  | 1/2010 | Zhang et al. |
| 2011/0205392 | A1* | 8/2011 | Yokoi ............... H04N 23/88 348/224.1 |
| 2012/0188399 | A1  | 7/2012 | Zhang |
| 2021/0160470 | A1* | 5/2021 | Afifi ................. G06T 3/40 |

OTHER PUBLICATIONS

International Search Report and Written Opinion—PCT/US2023/060579—ISA/EPO—May 4, 2023 (2200760WO).

* cited by examiner

*Primary Examiner* — Mekonnen D Dagnew
(74) *Attorney, Agent, or Firm* — QUALCOMM Incorporated

(57) ABSTRACT

This disclosure provides systems, methods, and devices for image processing that support enhanced white balancing operations. In a first aspect, a method of image processing includes receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and applying white balancing to the second image data based on the first intermediate white balance point. Other aspects and features are also claimed and described.

20 Claims, 7 Drawing Sheets

DIRECTIONALLY-ENHANCED AUTOMATIC WHITE BALANCING (AWB) CONVERGENCE

TECHNICAL FIELD

Aspects of the present disclosure relate generally to image processing, and more particularly, to automatic white balancing. Some features may enable and provide improved image processing, including reducing the display of unexpected colors when capturing images.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Human eyes perceive colors in a different manner than electronic image sensors. One configuration records separate red, green, and blue color values representing a scene. The appearance of a scene, and particularly the color of objects in the scene, is dependent on the illumination source. Different illumination sources have different light colors, which can be observed by comparing an incandescent bulb that outputs yellow-tinted white light to a light-emitting diode (LED) that outputs blue-tinted white light. Human eyes adapt to different light sources, whereas electronic image sensors generally capture light information identically in different scenes. As a result, the recorded colors from an electronic image sensor may not match the human-perceived color of the scene, such as when human eyes compensate for the yellow tinting to make white objects appear white even when lit by incandescent bulbs while the electronic image sensor records white objects as yellow when lit by incandescent bulbs. A white balancing algorithm may be applied to the output of the electronic image sensor to compensate for different lighting sources to improve the match between the electronic representation of the scene and the human-perceived appearance of the scene.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Automatic white balancing (AWB) in an image capture device analyzes received image data from an image sensor and generates corrected image data by adjusting the received image data to adjust a white balance in the image data, such as to compensate for a light source. For example, the received image data may be adjusted such that a white shirt that appears yellow due to, for example, sunlight or an incandescent bulb, correctly appears as white by adding some blue. Other colors in the scene may be adjusted in a similar manner based on adjustments used to correct white appearances to be white. During operation of an image capture, the AWB may determine to change from a first white balance point to a second white balance point. For example, a user walking from indoors to outdoors may cause the AWB to change to a different white balance point to adjust for the change from indoor to outdoor lighting. As another example, a user turning on a lamp in a room may cause the AWB to change to a different white balance point to adjust for the change from overhead lighting to lamp lighting. The AWB change may change over time to reduce abrupt changes. In some aspects, the change in white balance point from a first white balance point to a second white balance point may be performed based on a white balance reference line.

In one aspect of the disclosure, a method for image processing includes receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point.

In an additional aspect of the disclosure, an apparatus includes at least one processor and a memory coupled to the at least one processor. The at least one processor is configured to receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point.

In an additional aspect of the disclosure, an apparatus includes means for receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point.

In an additional aspect of the disclosure, a non-transitory computer-readable medium stores instructions that, when executed by a processor, cause the processor to perform operations. The operations include receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
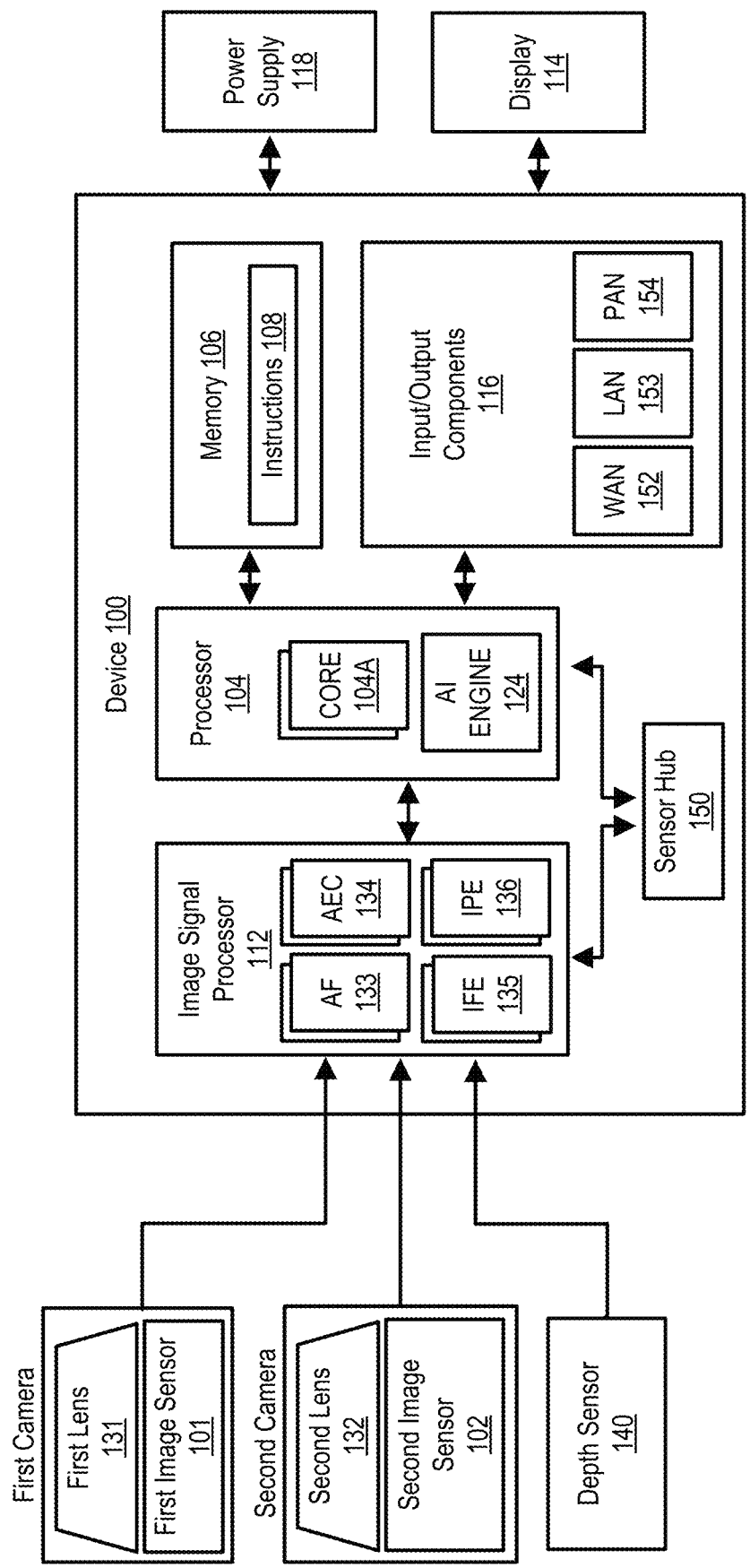
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Transitioning from one white balance point to another white balance point is conventionally performed by converging along a straight line from an old white balance point to the new white balance point. The transition along the straight line to the new white balance point causes the image capture device to pass through other white balance points. These other white balance points each have different color casts that change the appearance of the scene representation. A user of the image capture device may be observing the camera output while the white balance operation performs the change in white balance point. This may cause the user to observe unusual color changes in the image, such as when the camera output takes on a red, blue, or purple hue. For example, a camera application may be executing on the image capture device in a preview operation in which the user is observing in real time the output of a camera while allowing the user to depress a shutter button to capture a desired image frame as a photograph. When the user pans the image capture device from an indoor scene to an outdoor scene during the preview operation, the user may observe an orange color cast on the preview stream as the AWB converges on a new white balance point. These color casts are undesirable to the user, and if a user captures a photograph during the transition may result in a low-quality photograph.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

The present disclosure provides systems, apparatus, methods, and computer-readable media that support improved automatic white balancing by adjusting the manner in which the transition occurs. The transition may involve converging through other intermediate white balance points between starting and a target white balance points that are aligned along a direction of a white balance reference line. For example, the method may include determining a reference line direction of a target decision, determining an intermediate white balance point by applying the reference line direction on a target point to obtain a direction line and applying a strength parameter on the direction line. The process may be repeated to identify new intermediate white balance points that are closer to the target white balance point along a direction of the white balance reference line. The process may continue until a criteria is met and/or the white balance point converges on the target white balance point. Although an improved convergence operation is described with respect to an automatic white balancing (AWB) operation in examples throughout, converging along a white balance reference line may be applied to any white balance operation, such as those manually commanded by a user.

Particular implementations of the subject matter described in this disclosure may be implemented to realize one or more of the following potential advantages or benefits. In some aspects, the present disclosure provides techniques for improve image appearance by reducing unusual or unexpected color casts in image data received from an image sensor and viewed by a user. Transitioning through white balance points along a direction of a white balance reference line reduces or eliminates the appearance of color casts during the white balance transition.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112. The ISP 112 may additionally execute an automatic white balancing (AWB) engine for performing white balancing operations. The AWB engine may execute in, for example, the image front ends (IFEs) 135 or other dedicated or general processing circuitry within the ISP 112 or the image capture device 100.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
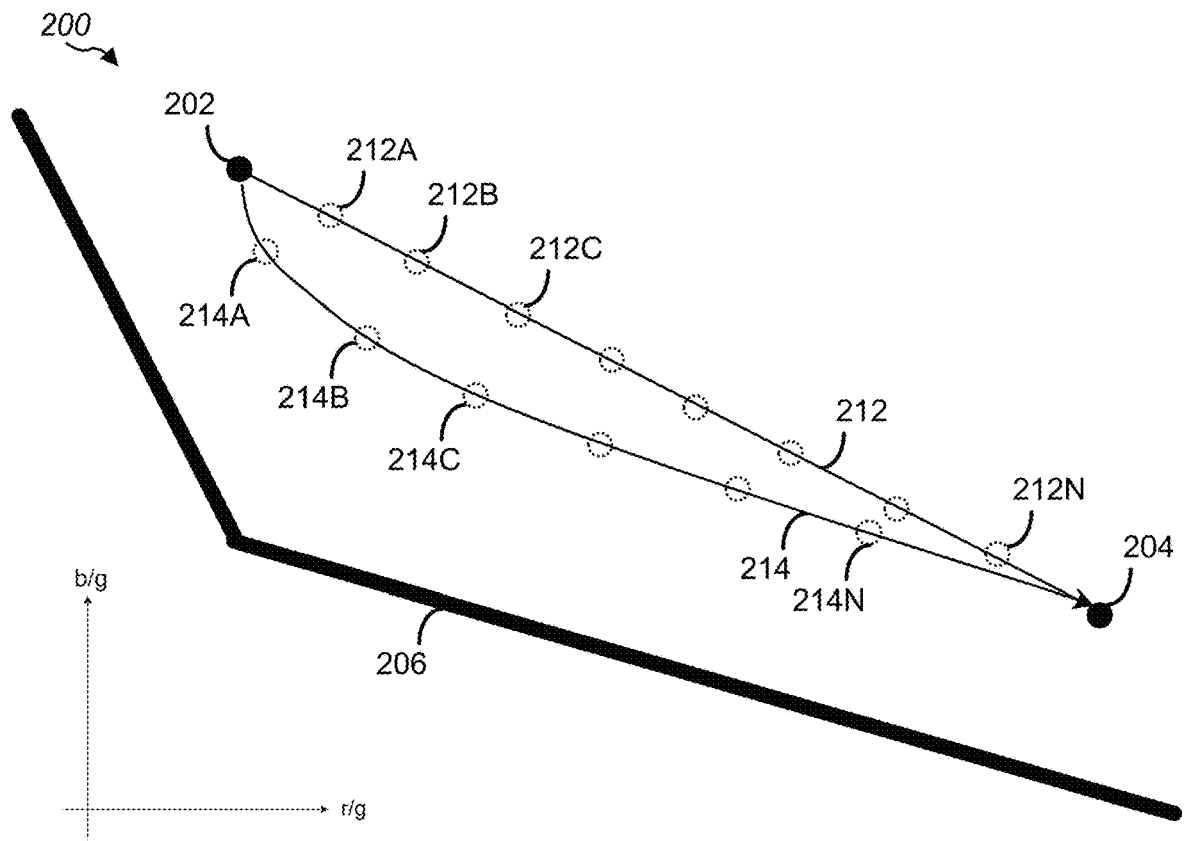
FIG. 2 is a graph illustrating a white balancing operation according to some embodiments of the disclosure.

FIG. 2 is a graph illustrating a white balancing operation according to some embodiments of the disclosure. A first white balance point 202 may be represented as a position on graph 200, which is a two-dimensional representation of color within image data. The two-dimensional representation uses a ratio of blue to green (b/g) as y-axis values and a ratio of red to green (r/g) as x-axis values. Different points on the graph 200 may correspond to different color temperatures. The first white balance point 202 may be a current white balance point, which is being used to process image data. A second white balance point 204 may also be represented on graph 200. The second white balance point 204 may be a target point determined by an automatic white balancing (AWB) operation for processing future image data. An image capture device may converge, rather than abruptly change, from the first white balance point 202 to the second white balance point 204 to reduce the appearance of the change from point 202 to point 204 in a display of the image data. Conventionally, the convergence from point 202 to point 204 follows path 212. Along path 212, a first image frame is determined at the white balance point 202 and subsequent image frames are determined at intermediate white balance points 212A, 212B, 212C, . . . , 212N, until the path 212 converges at target white balance point 204. Path 212 is a shortest distance path, which is a linear path from point 202 to point 204. The path 212 may cause unusual color casts on the appearance of images frames determined based on image data at the balancing points 212A-N as the AWB operation is converging from point 202 to point 204.

Another path 214 may be used to converge from point 202 to point 204. Along path 214, a first image frame is determined at the white balance point 202 and subsequent image frames are determined at intermediate white balance points 214A, 214B, 214C, . . . , 214N, until the path 214 converges at target white balance point 204. Each of the points 214A-N are determined with reference to a white balance reference line 206. In some embodiments, the reference to the white balance reference line 206 may result in the progression of balancing points 212A-N proceeding in a direction of the reference line 206. The path 214 may reduce or eliminate the appearance of unusual color casts on the appearance of image frames determined based on image data at balancing points 214A-N as compared with the balancing points 212A-N. The white balance reference line 206 may be a calibration curve corresponding to the image sensor from which image data is received and processed. The calibration curve may be based on reference points for the image sensor, which are calibrated in different illuminations.

Figure 3:
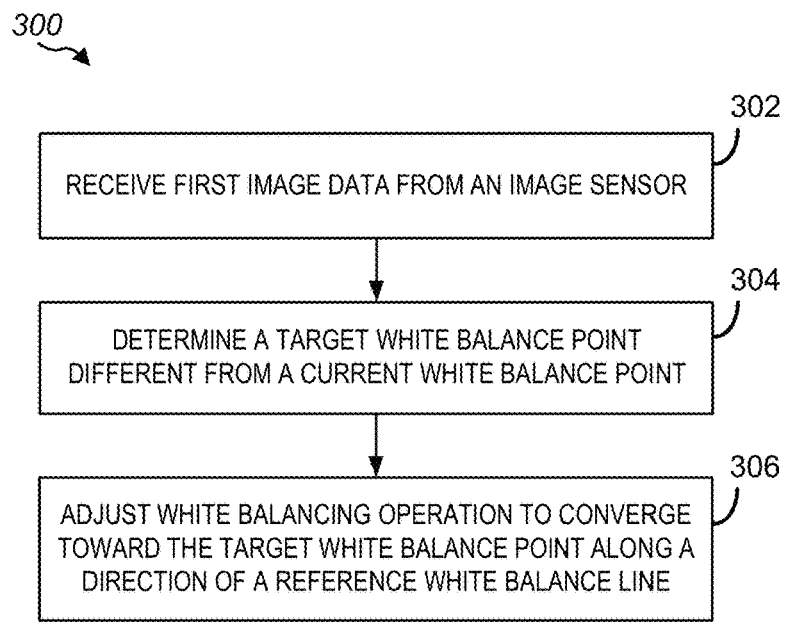
FIG. 3 is a flow chart illustrating a method of performing a white balancing operation according to some embodiments of the disclosure.

A method of operating an image capture device in accordance with a progression of white balance points 214A-N is shown in FIG. 3. FIG. 3 is a flow chart illustrating a method of performing a white balancing operation according to some embodiments of the disclosure. A method 300 includes receiving first image data from an image sensor, such as ISP 112 receiving image data from one of first image sensor 101, second image sensor 102, or depth sensor 140. In some embodiments, the first image data may be fused image data from multiple image sensors and/or multiple image frames from a single image sensor, such as when the first image data comprises high dynamic range (HDR) data.

At block 304, a target white balance point may be determined by analyzing the first image data. For example, automatic white balancing (AWB) executing on the ISP 112 may determine, based on data from one of the image sensors, that the desired white balance point is point 204 in FIG. 2. In some embodiments, the white balance point may be determined from image data that is different from the image data processed for preview images or still-frame image captures. The target white balance point 204 may be different from a current white balance point 202, such that the AWB does not immediately switch to the target point 204. Instead, the AWB may converge towards the target point 204. In some embodiments, the target point 204 may change before the convergence along a path reaches the target point 204.

At block 306, a white balancing operation, such as in automatic white balancing (AWB) of the ISP 112, may adjust the white balancing operation to converge towards the target white balance point determined at block 304. The convergence in block 306 may proceed along a direction of a reference white balance line, such as line 206 of FIG. 2. The convergence may occur as image data is received from the image sensor at block 302, and the first image data may be processed at points along the direction of the reference line. For example, a series of image frames may be determined from image data received from the image sensor, with each image frame determined with at a different white balance point. Using the convergence path 214 of FIG. 2 as an example, first image data may be processed to determine a first image frame at white balance point 214A, second image data may be processed to determine a second image frame at white balance point 214B, and third image data may be processed to determine a third image frame at white balance point 214C. The convergence along path 214 may continue until the target point 204 is reached, or the automatic white balancing (AWB) determines a new target point resulting in a change in direction.

Figure 4:
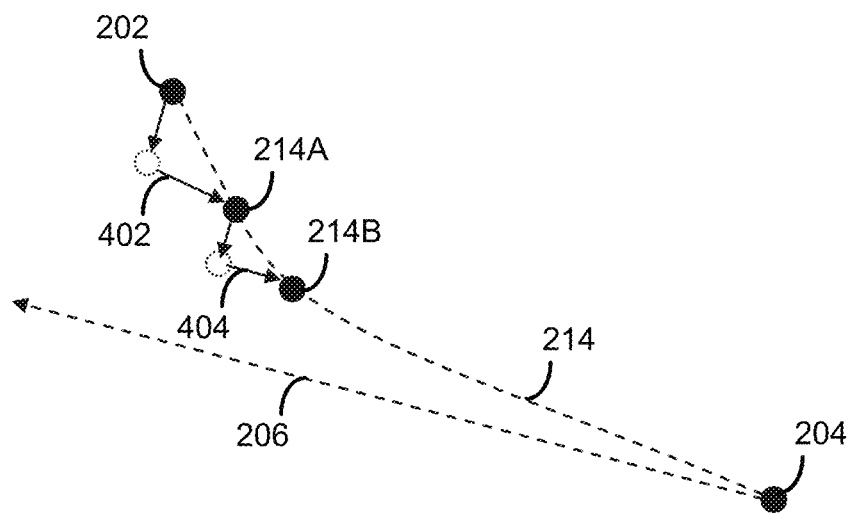
FIG. 4 is a graph illustrating a convergence operation of a white balancing operation progressing through a series of intermediate white balance points according to some embodiments of the disclosure.

An example determination of white balance points along a direction of a reference line during a convergence operation is shown in FIG. 4. FIG. 4 is a graph illustrating a convergence operation of a white balancing operation progressing through a series of intermediate white balance points according to some embodiments of the disclosure. Beginning with point 202, the AWB algorithm determines target point 204 and converges by proceeding along path 214 towards target point 204. Each intermediate target point 214A and 214B is determined along a direction 402 and 404, respectively, that are approximately parallel to the reference line 206, but with each point 214A and 214B approaching the target point 204 according to a weighting parameter, which may be used to set a convergence speed.

Additional details for one embodiment of determining intermediate white balance points along a convergence path based on a white balance reference line are described with reference to FIG. 5A, FIG. 5B, and FIG. 5C. A white balancing operation using a reference line may include determining the reference line direction of the target decision point; determining a modified temporal decision by applying the reference line direction vector on the target decision point; and determining a final temporal decision based on a strength weighting parameter.

Figure 5A:
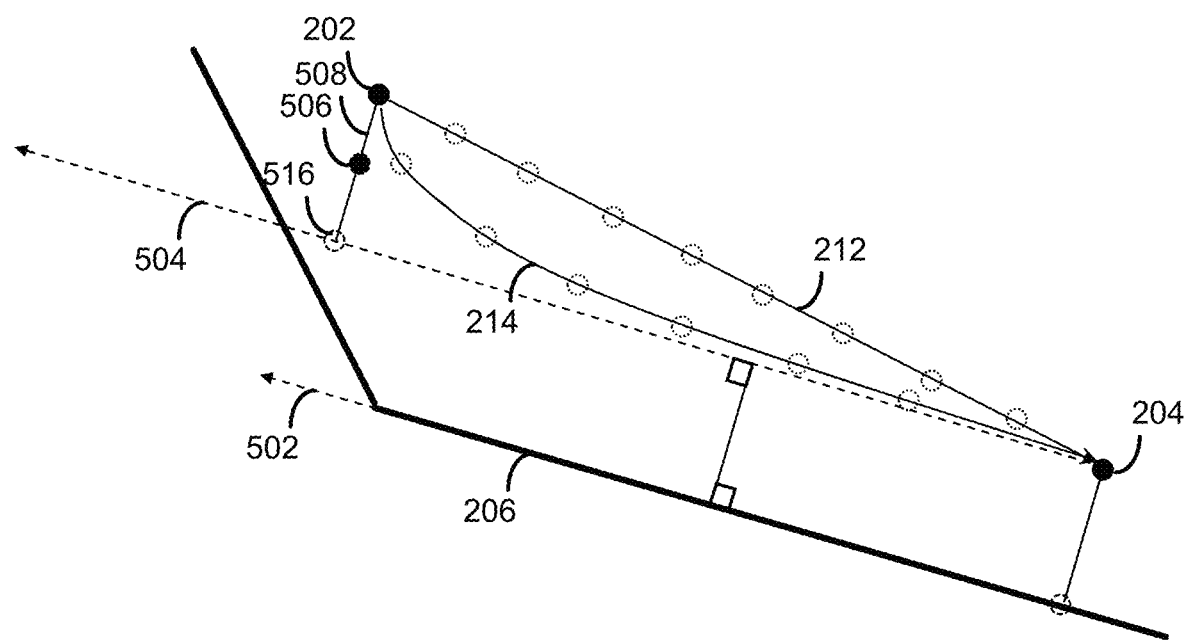
FIG. 5A is a graph illustrating determination of a white balance point according to some embodiments of the disclosure.

FIG. 5A is a graph illustrating determination of a white balance point according to some embodiments of the disclosure. A modified temporal decision 516 may be determined based on the target point 204 along a direction vector 504 parallel to a direction vector 502 of the white balance reference line 206. The modified temporal decision 516 lies on the direction vector 504 at a point corresponding to current white balance point 202. A final temporal decision 506 may be determined as a point along a line between the modified temporal decision 516 and the current white balance point 202. The final temporal decision 506 may be a distance 508 from the current white balance point 202 to the modified temporal decision 516, in which the distance 508 corresponds to a weighting parameter. A final temporal decision 506, Final, may be determined from the following equation:

$$Final=Modified*str+Original*(1-str),$$

wherein str is a parameter to interpolate the final temporal decision between an original temporal decision (e.g., point 202), Original, and a modified temporal decision (e.g., point 516), Modified. A higher value for the str parameter increases temporal convergence speed toward the target white balance point 204.

The final temporal decision 506 may be used to determine a first intermediate white balance point for converging towards the target white balance point 204. FIG. 5B is a graph illustrating determination of a white balance point according to some embodiments of the disclosure. A first intermediate white balance point 510 may be determined based on a line between the final temporal decision 506 and the target white balance point 204. The first intermediate white balance point 510 may be determined as the Frame1 value from the following equation:

$$Frame1=target*convspeed+DirectionalDecision0*(1-convspeed),$$

wherein target corresponds to the target white balance point 204, DirectionalDecision0 corresponds to the final temporal decision 506, and convspeed is a weighting parameter that determines how fast to converge from point 202 to point 204. The DirectionalDecision0 value may be determined from the following equation:

$$DirectionalDecision0=DirectionalTarget0*str+Frame0*(1-str),$$

wherein Frame0 corresponds to the value at white balance point 202, DirectionalTarget0 corresponds to the modified temporal decision 516, and str is a weighting parameter.

Figure 5B:
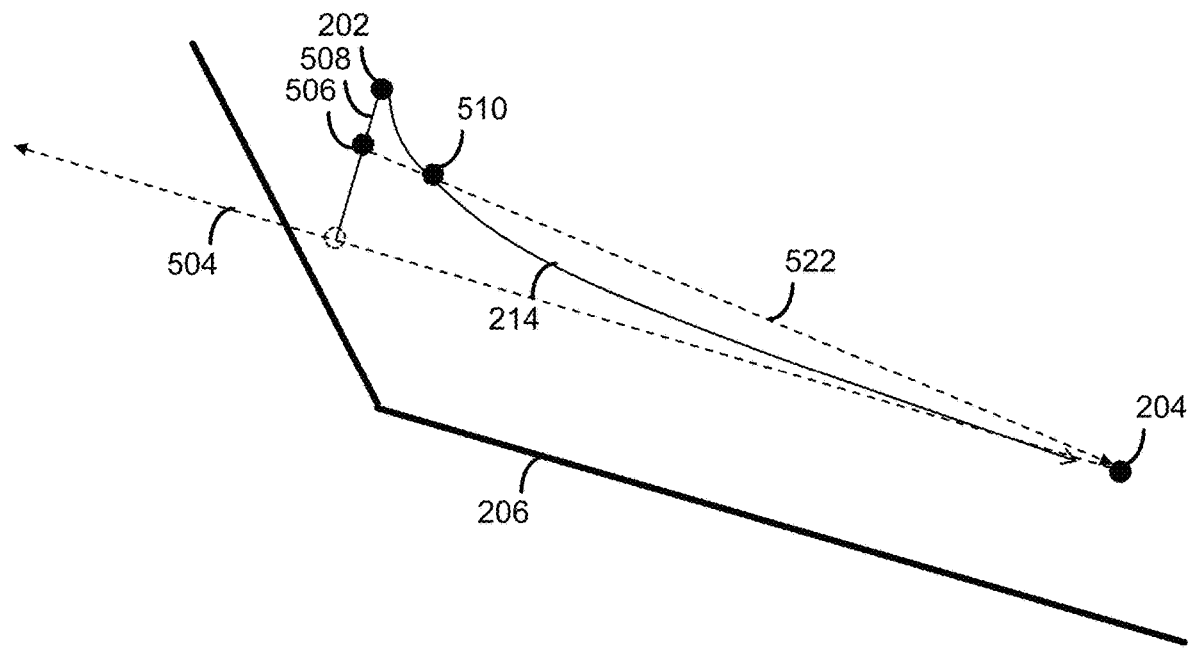
FIG. 5B is a graph illustrating determination of a white balance point according to some embodiments of the disclosure.
Figure 5C:
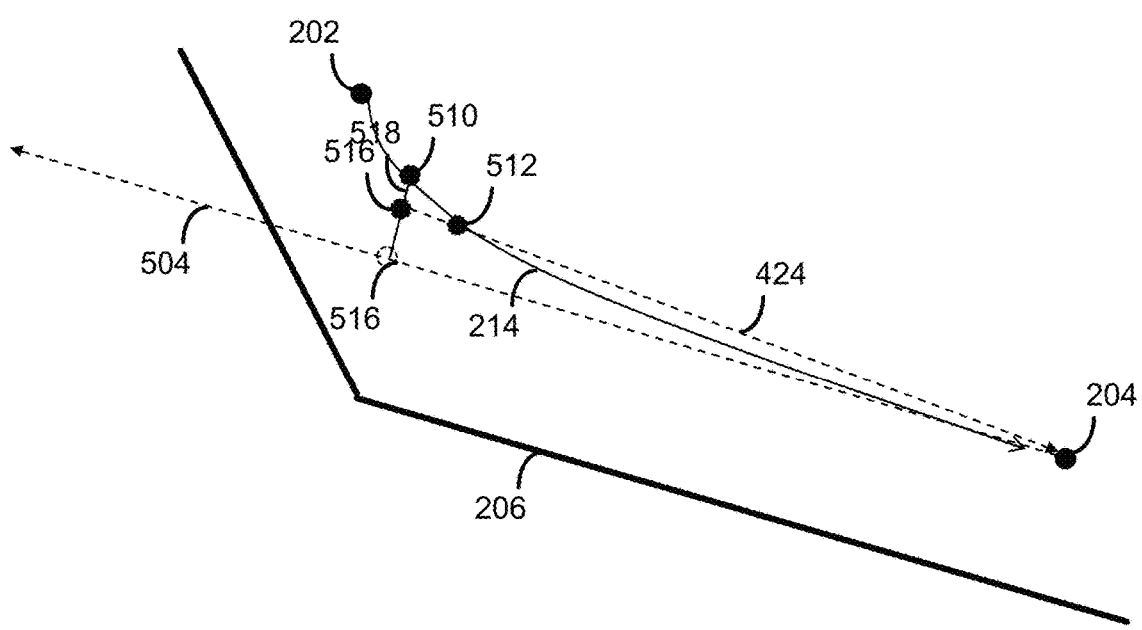
FIG. 5C is a graph illustrating determination of a white balance point according to some embodiments of the disclosure.

A subsequent intermediate white balance point, such as a second intermediate white balance point, may be determined from the first intermediate white balance point (Frame1) as shown in FIG. 5C. FIG. 5C is a graph illustrating determination of a white balance point according to some embodiments of the disclosure. A second intermediate white balance point 512 may be determined along a line between a directional decision point 516 and the target white balance point 204. The directional decision point 516 may be determined based on the first intermediate white balance point 510 and a weighting parameter, such as from the following equation:

$$DirectionalDecision1=DirectionalTarget1*str+Frame1*(1-str),$$

wherein DirectionalTarget1 corresponds to point 516 along directional vector 504 that is normal to first intermediate white balance point 510 and parallel to reference line 206, and a distance from first intermediate white balance point 510 and the directional decision point 516 corresponds to a weight parameter, str.

The second intermediate white balance point 512 may be computed based on the directional decision point 516, such as from the following equation:

$$Frame2=Target*convspeed+DirectionalDecision1*(1-convspeed),$$

wherein DiretionalDecision1 corresponds to directional decision point 516.

Figure 6:
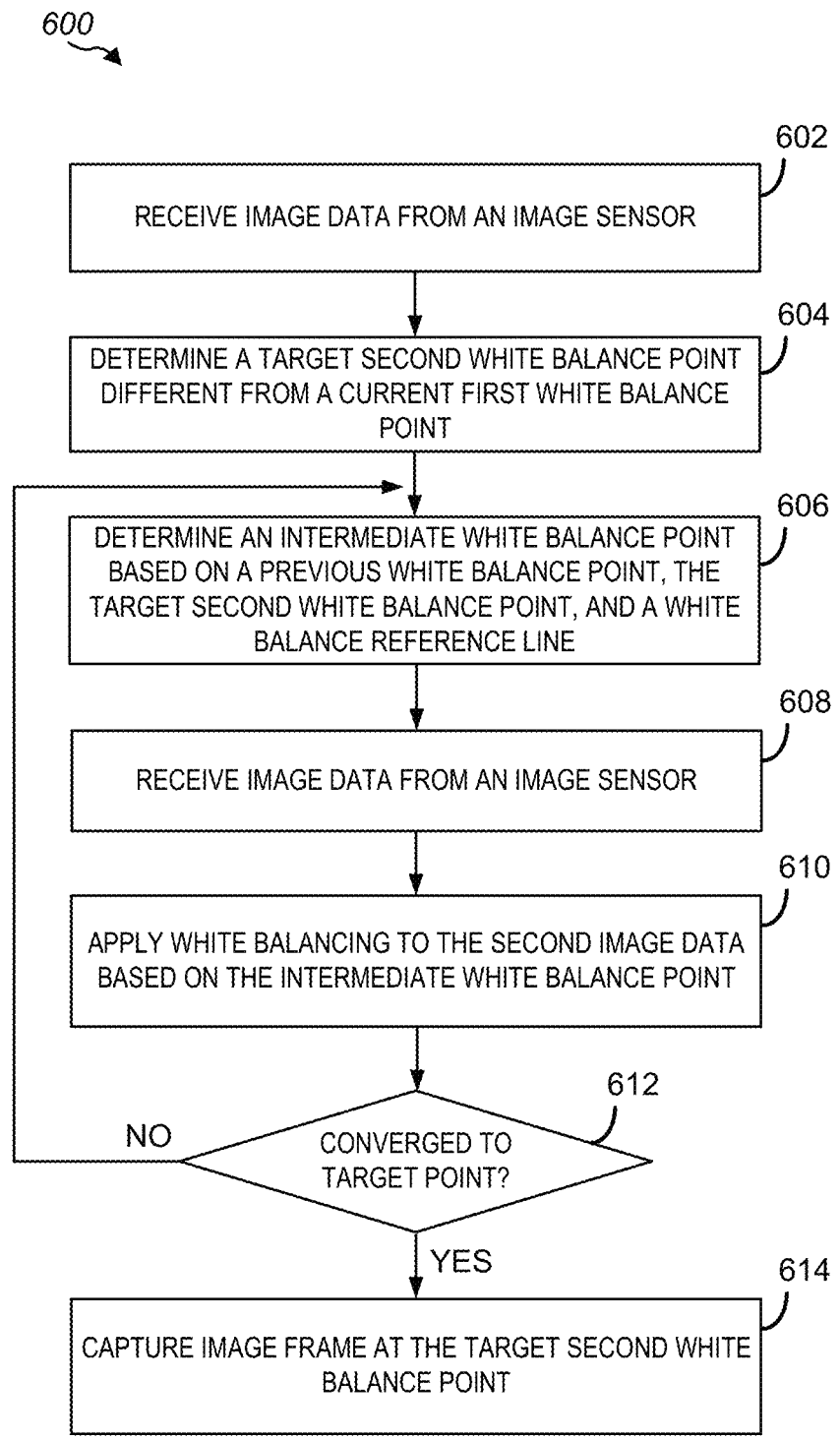
FIG. 6 is a flow chart illustrating a method of performing a white balancing operation according to some embodiments of the disclosure.

One method for executing a white balancing operation, such as the operation described in FIG. 5A, FIG. 5B, and FIG. 5C, is shown in FIG. 6. FIG. 6 is a flow chart illustrating a method of performing a white balancing operation according to some embodiments of the disclosure. A method 600 includes receiving first image data from an image sensor at block 602. For example, the method 600 may be executed by ISP 112 or processor 104 and receive image data from first image sensor 101, second image sensor 102, and/or depth sensor 140. At block 604, automatic white balancing (AWB) or other algorithm may determine a target second white balance point that is different from a current first white balance point. The method 600 proceeds through blocks 606, 608, 610, and 612 to converge towards the target second white balance point determined at block 604. In some embodiments, the AWB algorithm may continue to update a target white balance point during the determination of intermediate points, which causes a change in the calculation of subsequent intermediate points, or causes the method 600 to return to block 604.

At block 606, an intermediate white balance point is determined based on a previous white balance point (such as the current first white balance point or a previous intermediate white balance point, if available), the target second white balance point, and a white balance reference line. At block 608, image data is received from an image sensor, and at block 610 white balancing is applied to the image data received at block 608 using the intermediate white balance point determined at block 606. At block 612, the method 600 determines if the determined white balance point at block 606 has converged to the target white balance point determined at block 604. If convergence has not been reached, such as the intermediate white balance point of block 606 being outside a threshold amount of the target second white balance point and/or other criteria are met, the blocks 606, 608, and 610 may be repeated for processing additional image data into additional image frames white balanced at additional intermediate white balance points to further converge towards target second white balance point. When convergence is reached, the method 600 may proceed to perform another action, such as to capture an image frame at the target second white balance point at block 614. For example, the captured image at block 614 may be stored as a photograph in a user's photo gallery. Other criteria may be used to determine whether to capture an image frame or perform another operation after convergence. In some embodiments, no action is taken after convergence, such as when no shutter button was pressed, and preview images continue to be generated at the target second white balance point until the automatic white balancing (AWB) determines a new target white balance point.

Figure 7:
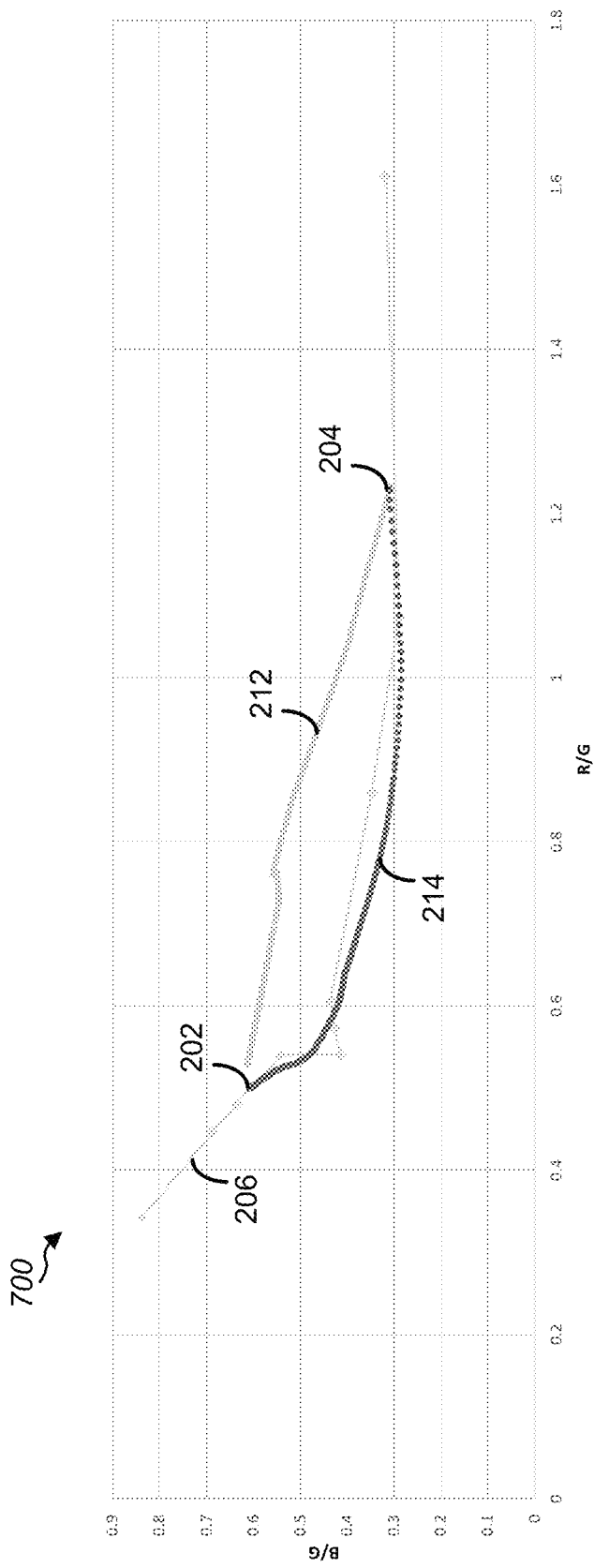
FIG. 7 is a graph illustrating a convergence operation of a white balancing operation according to some embodiments of the disclosure.

Although certain white balancing convergence paths are described and illustrated with reference to, for example, FIG. 2, FIG. 5A, FIG. 5B, and FIG. 5C, the convergence path may take other shapes while still embodying the aspect of determining white balance points based on a white balance reference line. One such operation is shown in and described with reference to FIG. 7. FIG. 7 is a graph illustrating a convergence operation of a white balancing operation according to some embodiments of the disclosure. Graph 700 illustrates a white balance reference line 206. An automatic white balancing (AWB) operation may converge from a current white balance point 202 to a target white balance point 204. A conventional, linear convergence path 212 is shown between white balance point 202 and target white balance point 204. A convergence path 214 based on the white balance reference line 206 also converges from white balance point 202 to target white balance point 204, but along a path that reduces color casts on image frames processed during the convergence. As a result, the direction of the white balance convergence path 214 is similar to the direction of white balance reference line 206. The path 214 of FIG. 7 shows some deviation from the line 214 of FIG. 2 because the white balancing operation may continuously adjust, such as on a frame-by-frame basis, the target point 204 based on the contents of the scene.

Figure 8:
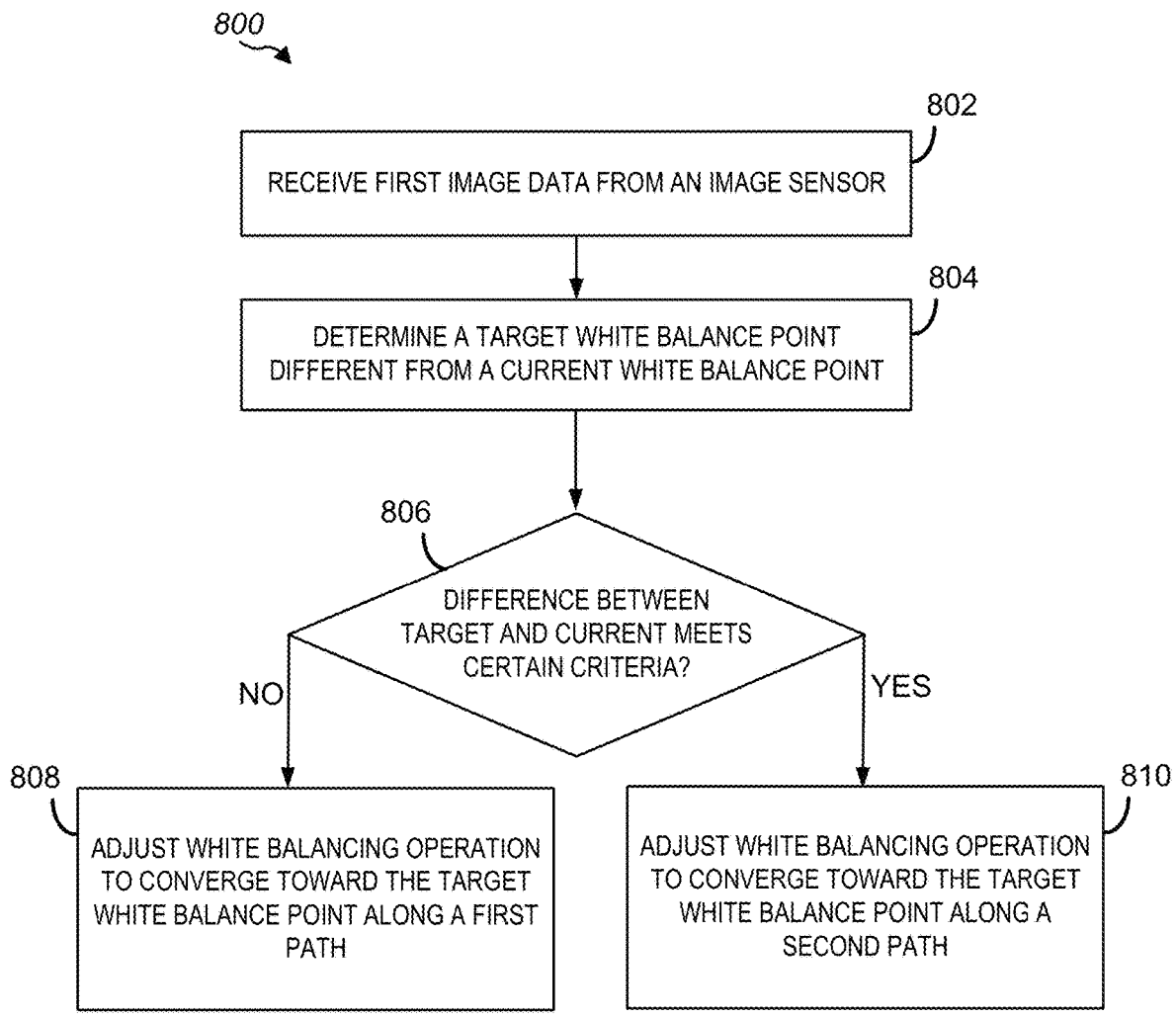
FIG. 8 is a flow chart illustrating a method of determining a manner of converging to a new white balance point according to some embodiments of the disclosure.

As shown, for example, in FIG. 2 and FIG. 7, several convergence paths may be available for proceeding from a current white balance point 202 to a target white balance point 204. A processor, such as ISP 112 or processor 104, may use criteria to determine which convergence path to implement when processing image data, as shown in and described with reference to FIG. 8. FIG. 8 is a flow chart illustrating a method of determining a manner of converging to a new white balance point according to some embodiments of the disclosure. A method 800 includes receiving image data from an image sensor at block 802. For example, the method 800 may be executed by ISP 112 or processor 104 and receive image data from first image sensor 101, second image sensor 102, and/or depth sensor 140. At block 804, automatic white balancing (AWB) or other algorithm may determine a target second white balance point that is different from a current first white balance point. The method 800 may choose between several convergence paths based on one or more criteria. For example, at block 806, the method 800 may determine whether a difference between target and current white balance points meet certain criteria, such as being larger than a threshold amount.

If the criteria are not met, the method 800 continues to block 808 to adjust the white balancing operation to converge toward the target white balance point along a first path. In some embodiments, the first path may be a linear or shortest path between the current white balance point and the target white balance point, such as path 204 of FIG. 2. If the criteria are met, the method 800 continues to block 810 to adjust the white balancing operation to converge toward the target white balance point along a second path. In some embodiments, the second path may be a path based on a direction of the white balance reference line, such as path 214 of FIG. 2.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point. Additionally, the apparatus may perform or operate according to one or more aspects as described below.

In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, determining the first intermediate white balance point comprises determining the first intermediate white balance point as a point on a non-linear path from the first white balance point to the second white balance point that is along a direction of the white balance reference line.

In a third aspect, in combination with one or more of the first aspect or the second aspect, determining the first intermediate white balance point is further based on a convergence speed parameter.

In a fourth aspect, in combination with one or more of the first aspect through the third aspect, determining a second intermediate white balance point based on the first intermediate white balance point, the second white balance point, and the white balance reference line; receiving third image data from the image sensor; and/or applying white balancing to the third image data based on the second intermediate white balance point.

In a fifth aspect, in combination with one or more of the first aspect through the fourth aspect, determining the first intermediate white balance point comprises determining a sum of a first product of the first white balance point and a weighting parameter with a second product of the second white balance point and a factor based on the weighting parameter.

In a sixth aspect, in combination with one or more of the first aspect through the fifth aspect, the apparatus is further configured for determining a second intermediate white balance point by determining a sum of a third product of the second white balance point and the weighting parameter with a fourth product of the first intermediate white balance point and a factor based on the weighting parameter; receiving third image data from the image sensor; and/or applying white balancing to the third image data based on the second intermediate white balance point.

In a seventh aspect, in combination with one or more of the first aspect through the sixth aspect, the apparatus is further configured for determining whether a difference between the first white balance point and the second white balance point is greater than a threshold amount; and/or determining to converge from the first white balance point to the second white balance point along a path corresponding to a direction of the white balance reference line.

In an eighth aspect, in combination with one or more of the first aspect through the seventh aspect, the apparatus may also include an image sensor and/or other camera components, such as a lens coupled to the image sensor.

In a ninth aspect, in combination with one or more of the first aspect through the eighth aspect, the apparatus includes an image signal processor configured to perform the steps of receiving first image data from an image sensor; determining to adjust a white balancing operation from a first white balance point to a second white balance point; determining a first intermediate white balance point based on the first white balance point, the second white balance point, and a white balance reference line; receiving second image data from the image sensor; and/or applying white balancing to the second image data based on the first intermediate white balance point.

In a tenth aspect, in combination with one or more of the first aspect through the ninth aspect, the image signal processor is further configured to encode the second image data as an image file for storage in memory and/or transmission to a second processor for further processing, such as to output as part of a preview image on a display, include as a photograph in a gallery, transmit as a message to another wireless device, and/or transmit to a printer for printing on photo paper.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving first image data from an image sensor;
   determining to adjust a white balancing operation from a first white balance point to a second white balance point;
   determining a first intermediate white balance point based on the first white balance point, the second white balance point, and a direction of a white balance reference line;
   receiving second image data from the image sensor; and
   applying white balancing to the second image data based on the first intermediate white balance point.

2. The method of claim 1, wherein determining the first intermediate white balance point comprises determining the first intermediate white balance point as a point on a non-linear path from the first white balance point to the second white balance point that is along the direction of the white balance reference line.

3. The method of claim 1, wherein determining the first intermediate white balance point is further based on a convergence speed parameter.

4. The method of claim 1, further comprising:
   determining a second intermediate white balance point based on the first intermediate white balance point, the second white balance point, and the white balance reference line;
   receiving third image data from the image sensor; and
   applying white balancing to the third image data based on the second intermediate white balance point.

5. The method of claim 1, wherein determining the first intermediate white balance point comprises determining a sum of a first product of the first white balance point and a weighting parameter with a second product of the second white balance point and a factor based on the weighting parameter.

6. The method of claim 5, further comprising:
   determining a second intermediate white balance point by determining a sum of a third product of the second white balance point and the weighting parameter with a fourth product of the first intermediate white balance point and a factor based on the weighting parameter;
   receiving third image data from the image sensor; and
   applying white balancing to the third image data based on the second intermediate white balance point.

7. The method of claim 1, further comprising:
   determining whether a difference between the first white balance point and the second white balance point is greater than a threshold amount; and
   determining to converge from the first white balance point to the second white balance point along a path corresponding to the direction of the white balance reference line.

8. An apparatus, comprising:
a memory storing processor-readable code; and
at least one processor coupled to the memory, the at least one processor configured to execute the processor-readable code to cause the at least one processor to perform operations including:
receiving first image data from an image sensor;
determining to adjust a white balancing operation from a first white balance point to a second white balance point;
determining a first intermediate white balance point based on the first white balance point, the second white balance point, and a direction of a white balance reference line;
receiving second image data from the image sensor; and
applying white balancing to the second image data based on the first intermediate white balance point.

9. The apparatus of claim 8, wherein determining the first intermediate white balance point comprises determining the first intermediate white balance point as a point on a non-linear path from the first white balance point to the second white balance point that is along the direction of the white balance reference line.

10. The apparatus of claim 8, wherein the processor-readable code causes the at least one processor to perform further operations including:
determining a second intermediate white balance point based on the first intermediate white balance point, the second white balance point, and the white balance reference line;
receiving third image data from the image sensor; and
applying white balancing to the third image data based on the second intermediate white balance point.

11. The apparatus of claim 8, wherein determining the first intermediate white balance point comprises determining a sum of a first product of the first white balance point and a weighting parameter with a second product of the second white balance point and a factor based on the weighting parameter.

12. The apparatus of claim 11, wherein the processor-readable code causes the at least one processor to perform further operations including:
determining a second intermediate white balance point by determining a sum of a third product of the second white balance point and the weighting parameter with a fourth product of the first intermediate white balance point and a factor based on the weighting parameter;
receiving third image data from the image sensor; and
applying white balancing to the third image data based on the second intermediate white balance point.

13. The apparatus of claim 8, wherein the processor-readable code causes the at least one processor to perform further operations including:
determining whether a difference between the first white balance point and the second white balance point is greater than a threshold amount; and
determining to converge from the first white balance point to the second white balance point along a path corresponding to the direction of the white balance reference line.

14. A non-transitory computer-readable medium storing instructions that, when executed by a processor, cause the processor to perform operations comprising:
receiving first image data from an image sensor;
determining to adjust a white balancing operation from a first white balance point to a second white balance point;
determining a first intermediate white balance point based on the first white balance point, the second white balance point, and a direction of a white balance reference line;
receiving second image data from the image sensor; and
applying white balancing to the second image data based on the first intermediate white balance point.

15. The non-transitory, computer-readable medium of claim 14, wherein determining the first intermediate white balance point comprises determining the first intermediate white balance point as a point on a non-linear path from the first white balance point to the second white balance point that is along the direction of the white balance reference line.

16. The non-transitory, computer-readable medium of claim 14, wherein determining the first intermediate white balance point is further based on a convergence speed parameter.

17. The non-transitory, computer-readable medium of claim 14, wherein the instructions, when executed by a processor, cause the processor to perform further operations comprising:
determining a second intermediate white balance point based on the first intermediate white balance point, the second white balance point, and the white balance reference line;
receiving third image data from the image sensor; and
applying white balancing to the third image data based on the second intermediate white balance point.

18. The non-transitory, computer-readable medium of claim 14, wherein determining the first intermediate white balance point comprises determining a sum of a first product of the first white balance point and a weighting parameter with a second product of the second white balance point and a factor based on the weighting parameter.

19. The non-transitory, computer-readable medium of claim 18, wherein the instructions, when executed by a processor, cause the processor to perform further operations comprising:
determining a second intermediate white balance point by determining a sum of a third product of the second white balance point and the weighting parameter with a fourth product of the first intermediate white balance point and a factor based on the weighting parameter;
receiving third image data from the image sensor; and
applying white balancing to the third image data based on the second intermediate white balance point.

20. The non-transitory, computer-readable medium of claim 14, wherein the instructions, when executed by a processor, cause the processor to perform further operations comprising:
determining whether a difference between the first white balance point and the second white balance point is greater than a threshold amount; and
determining to converge from the first white balance point to the second white balance point along a path corresponding to the direction of the white balance reference line.

* * * * *